United States Patent [19]
Dunfield

[11] Patent Number: 5,907,455
[45] Date of Patent: May 25, 1999

[54] DISTRIBUTED SPINDLE MOTOR INTEGRATED WITH DISC

[75] Inventor: John Charles Dunfield, Santa Cruz, Calif.

[73] Assignee: Seagate Technology, Inc., Scotts Valley, Calif.

[21] Appl. No.: 08/648,351

[22] Filed: May 15, 1996

[51] Int. Cl.⁶ .................................................. G11B 17/02
[52] U.S. Cl. ............................................................ 360/99.08
[58] Field of Search ............................... 360/99.08, 98.07

[56] References Cited

U.S. PATENT DOCUMENTS 5,257,151  10/1993  Cooper et al. ...................... 360/98.07
5,488,523   1/1996  Seaver et al. ...................... 360/99.08

*Primary Examiner*—Robert S. Tupper
*Attorney, Agent, or Firm*—Flehr Hohbach Test Albritton & Herbert LLP

[57] ABSTRACT

The spindle motor is integrated with the disc by incorporating one of the poles or coils of the motor with a region on the disc, and the remaining portion of the motor being distributed over an internal surface or surfaces of the housing for the disc, or over the edge of an adjacent disc. By activating the portion of the motor which is supported from the disc housing, the disc can be rotationally driven. The motor poles may be either deposited or etched on the disc, or separately formed and attached to the disc housing. The result is a substantially smaller height disc drive, achieved with a much reduced cost.

27 Claims, 5 Drawing Sheets

| FREQUENCY (3750RPM) HZ | POLES 2.5" | POLE SPACING MICRONS | MFGR TECHNOLOGY | BEARING TECHNOLOGY |
|---|---|---|---|---|
| 2.5 $10^2$ | 8 | 2.49E4 | CONVENTIONAL | CONVENTIONAL |
| $10^3$ | 32 | 6.23E3 | ↓ | ↓ |
| $10^4$ | 320 | 623 | | |
| $10^5$ | 3200 | 62.3 | ↓ | ↓ |
| $10^6$ | 32000 | 6.23 | SEMI-CONDUCTOR | HYDRODYNAMIC MAGNETIC |

…

DISTRIBUTED SPINDLE MOTOR INTEGRATED WITH DISC

FIELD OF THE INVENTION

The present invention relates generally to improved disc drive storage devices, and more particularly to designs for integrating a motor with a disc in a disc drive.

BACKGROUND OF THE INVENTION

The present invention relates to an improvement in information storage systems, and especially in the means for providing constant rotation to the disc on which data is stored.

Overall disc drive size is a paramount concern to the drive design engineers. As smaller, light weight portable computers have grown in demand, their engineers have continually searched for ways to reduce both the overall size, weight and internal friction of the disc drive while maintaining or improving overall drive performance.

Present spindle motor technology is typically a multi-phase brushless DC motor which has been designed for long life at constant rotational speeds. However, such motors, while designed with increased sophistication, still occupy a major percentage of the overall internal envelope of the disc drive. Typically, such spindle motors extend below the envelope where the discs are rotating, with rotating discs supported on a hub on the top of the spindle motor. Obviously, this significantly increases the overall height of the drive. The alternative approach is to use what is called an in hub spindle motor, where both the motor, rotor and stator are incorporated within the hub of the disc. This dramatically reduces the height of the drive; however, it must necessarily increase the diameter of the hub, resulting in a net loss in data storage space on the surface of the disc.

The problem left unresolved by such approaches therefore is to provide a motor within the defined disc drive envelope which imparts constant rotational speed to the spinning discs, while minimizing the amount of internal disc drive space which must be devoted to the mechanics of the spindle motor.

SUMMARY OF THE INVENTION

It is therefore an objective of the present invention to provide apparatus for rotating the discs of a disc drive at constant speed while utilizing a minimum number of parts and internal drive space.

A further objective of the invention is to provide a highly stable source of rotation to the disc or discs.

A further objective of the invention is to provide drive means for the disc which are simply assembled from a minimum number of parts.

These and other objectives of the present invention are achieved by integrating the spindle motor with the disc by incorporating one of the poles or coils of the motor with a region on the disc, and the remaining portion of the motor being distributed over an internal surface or surfaces of the housing for the disc, or over the edge of an adjacent disc. By activating the portion of the motor which is supported from the disc housing, the disc can be rotationally driven.

According to this invention, the motor poles may be either deposited or etched on the disc, or separately formed and attached to the disc housing. The result is a substantially smaller height disc drive, achieved with a much reduced cost. Conversely, a disc drive based on this invention built of the same height as drives based on known technology would provide more data storage capacity.

The separate elements of the motors could have either fairly large features, being established by standard motor technology techniques, or could have very fine features, utilizing semiconductor etching technology to etch the desired portions on the surface of the disc. This latter approach is especially useful in the light of the utilization of thin film and other integrated circuit fabrication techniques being utilized in the formation of other components and systems for use in disc drives.

Other features and advantages of the present invention will become apparent to a person of skill in the art who studies the following detailed description of a preferred embodiment given in conjunction with the accompanying drawings.

DETAILED DESCRIPTION OF A PREFERRED EMBODIMENT

Figures 1, 2A:
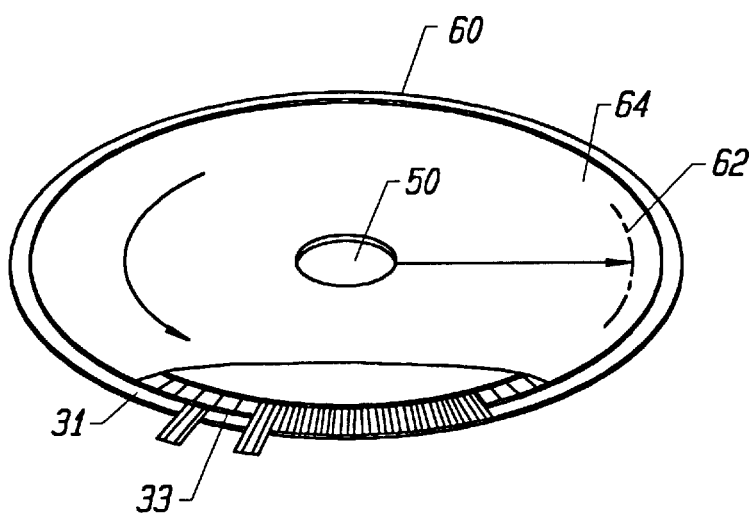
FIG. 1 comprises a table setting forth the dimensions and speeds of rotation achievable using this invention.
FIGS. 2A and 2B illustrate the physical structural elements utilized to implement this invention in a disc drive.

A distributed motor integrated with a disc for use especially in an information storing disc drive is described below. In the following description, certain specific details may be set forth such as dimensions, materials, spacings and the like; however, it is obviously to one of skill in the art that the invention may be practiced without adhering to the specific details unless otherwise expressly noted in the text of the application. In other instances, well known elements and processing techniques have not been shown in particular detail in order to avoid unnecessarily obscuring the present invention.

The basis of the approach is that the motor magnetic poles are deposited by sputtering or some other means on a disc. The disc is driven by a revolving magnetic field distributed over the surface of an adjacent preferably stationary driving disc.

This field is provided by stationary windings distributed around the edge of the driving disc. This driving disc may contain no region for data, or the windings region can be integrated with data on the disc.

The motor can also extend in the radial direction, extending beyond the radius of the "data" disc for more driving torque.

For example, if the parameter "T" is the distance apart of adjacent pole pairs (P/2, where P is the number of poles), and assuming synchronous speed operations, then $$\dot{x}(ips) = Tf$$

In terms of synchronous speed, $$ns=120f/P$$

where "ns" is the speed in rpm, "+f" is the excitation frequency. Then, of course, T=π D/P, where D is the desired motor diameter.

Both equations point out that at a fixed speed, with many distributed poles, the excitation frequency (f) must be high for a higher number of poles, or short spacing between poles. The Table establishes that a high excitation frequency is not necessary for a motor designed according to the principles of this invention, so long as the spacing of the poles is high, and the number of poles is low.

Table 1 lists some of the primary design considerations which are based on the desired speed of rotation for the disc; this in turn dictates the number of poles which would be needed, and the pole spacing in microns. The technology which could be used to define the poles, and the available technology which could be used for bearings to support the center of the disc for rotation at the target speed are also set forth in the table.

Thus for example to have a motor with an 8 pole magnet, shown at the second line of the table, if one looked at a conventional motor, you would find the pole spacing to be 2.49 $e^4$ microns as the spacing. As shown in the next two columns, conventional manufacturing technology and conventional bearing technology would be used to define such a motor.

Considering an alternative example, looking at the bottom row of the table, the table dictates a frequency of 1 MHz, with pole spacings of about 6 microns. Such pole spacings could obviously only be defined utilizing semiconductor technology. Also, it can be seen that more than 30,000 poles would be needed. As shown, this would be achieved using thin film etching techniques (already a known technology) and incorporating hydrodynamic or magnetic bearings, because such spacings would not tolerate the inconsistencies in manufacture which result from the use of mechanical bearings such as ball bearings.

It must also be remembered that Table 1 is based on a two and a half inch drive as measured near the O.D. Thus if the design were to be used in a three and a half inch drive, then the numbers would be ratioed accordingly.

Figure 3A:
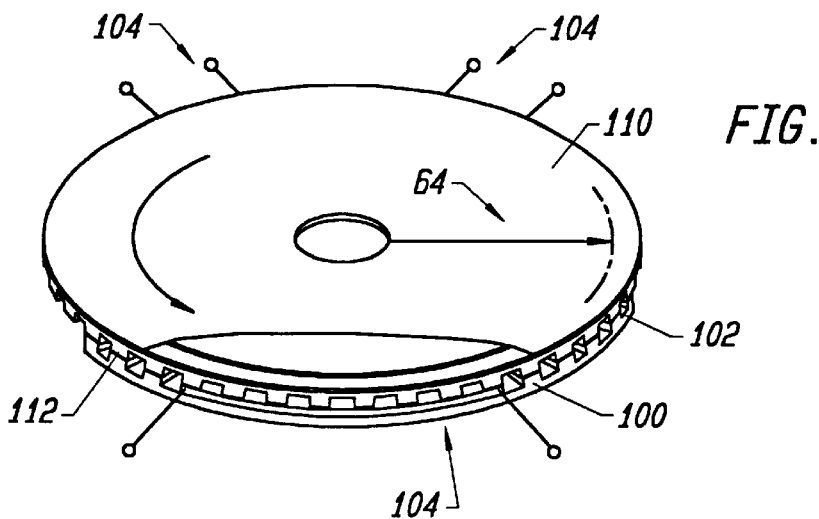
FIGS. 3A–3D illustrate an alternative, polyphase motor.
Figure 3B:
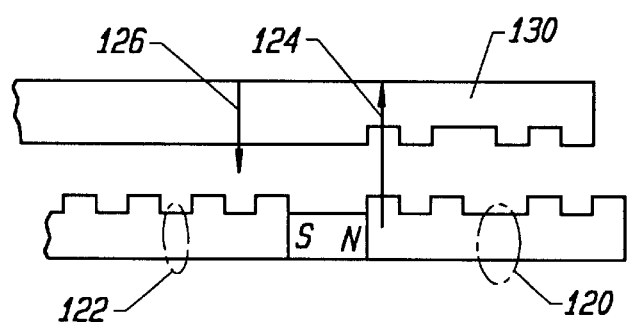
Figure 3C:
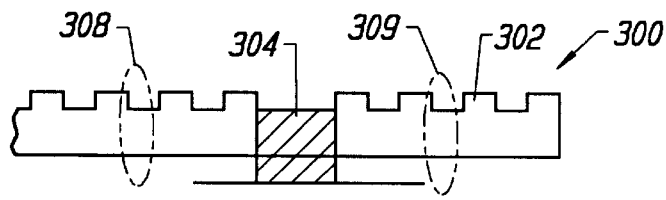
Figure 3D:
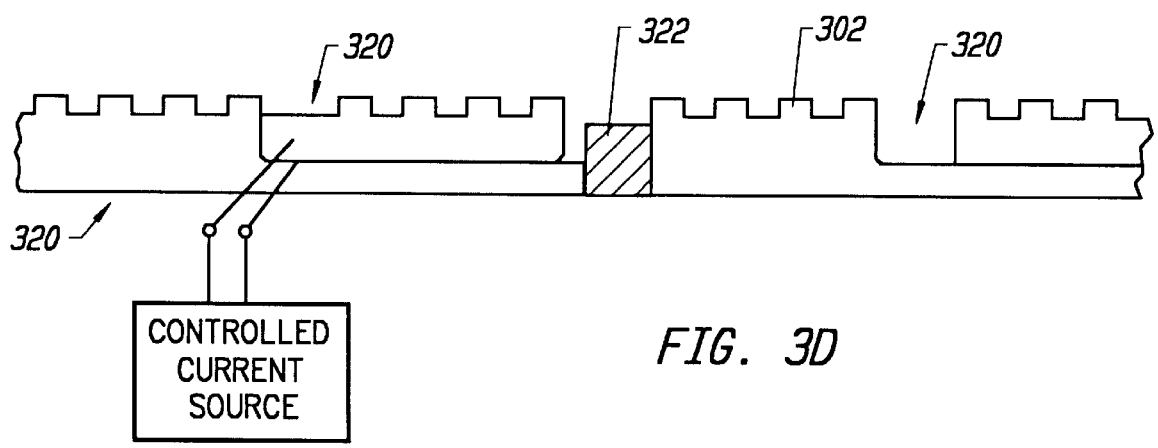
Figure 4:
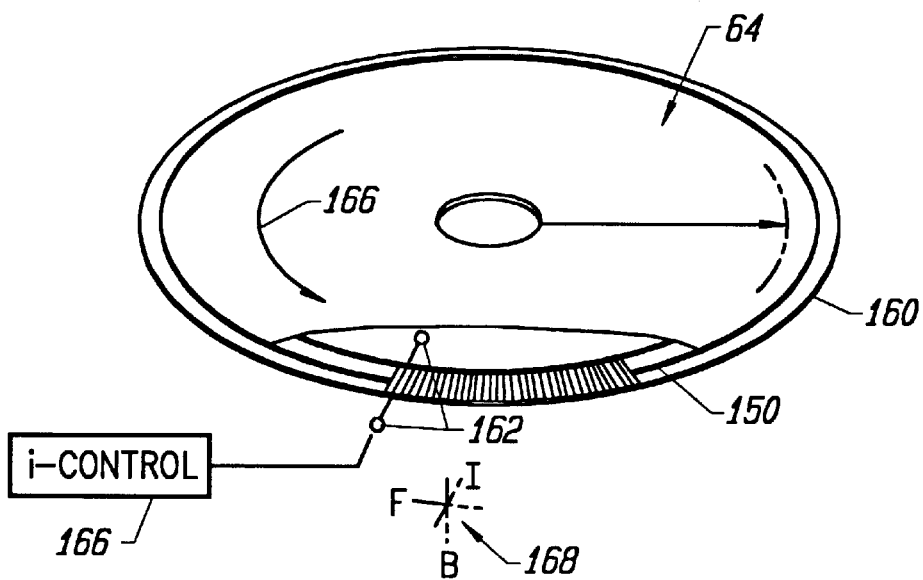
FIG. 4 illustrates use of a homopolar motor.

Turning next to FIGS. 2 through 4, these figures illustrate sample embodiments of a spindle motor integrated with one of the discs in a disc drive as well as some specific details thereof. In considering this disclosure it must be remembered that the gap must be much smaller than the pole spacing, as a measure of magnetic efficiency in the motor is the air gap to pole pitch ratio. As the pole pitch becomes smaller, so must the air gap, the gap being substantially smaller than the pole spacing. As an example, to achieve motor efficiency utilizing a 6 micron pole spacing, a spacing for the gap of about 1 micron would be needed. Otherwise the motor would not be magnetically efficient. This is also the reason for the use of hydrodynamic bearings in these designs.

FIGS. 2, 3 and 4 illustrate different approaches to integrating a spindle motor with the disc. Only the essential features of the present invention are shown. Means for reading data from the disc, or for supporting the disc for constant speed rotation in response to energization of the spindle motor are well known in the technology, and need not be described herein in detail.

Figure 2B:
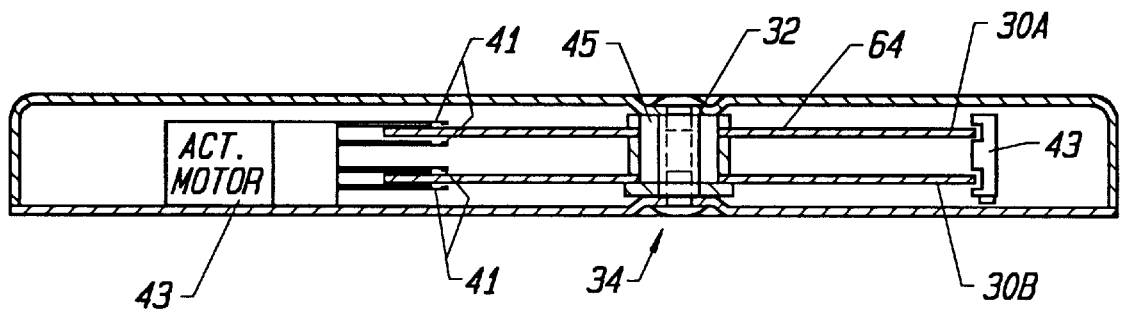
Figure 2C:
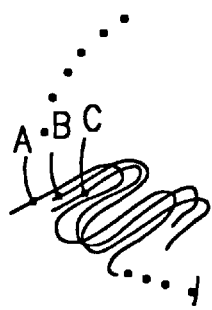
FIG. 2C illustrates the overlapping lead structure utilized in a preferred embodiment of the invention.

A vertical section of a disc drive in which the present invention could be incorporated is shown in FIG. 2B. Such a disc drive in which the distributed spindle motor of the present invention may be utilized would include at least one disc; in this particular example two discs 30a, 30b are shown supported from a hub 64, for rotation about a central bearing structure 32.

Adjacent one edge of the rotating discs can be found a plurality of actuator arms 41 which support transducers for reading and writing on the surface of the disc. An actuator motor 43 is shown for moving the arms 41 over the surface of the disc. In accordance with the invention, motor drive means 43 are provided adjacent the edge of the disc around the entire periphery of the disc and cooperating therewith to drive the discs at a constant rotational speed. This cooperative element could also be realized as a stationary disc shape mounted close adjacent and parallel to the outer edge of the data disc.

The discs are supported for rotation by a hydrodynamic bearing 45, (shown schematically) of a type well known in this technology. However, pursuant to the present invention, the size of the hub and bearing mount would be dramatically reduced and the hole in the center 50 would also be reduced in diameter because there would no longer be any need for space for an in hub motor to establish the constant rotation of the disc. Returning to FIG. 2A, typically the disc supporting or whose edge is used to define the motor elements would be made of a high coercivity material so that one can magnetize the outer section or perimeter of the disc, forming a perimeter comprising a series of alternating north and south poles around the circumference 60 of the disc. Thus is formed the necessary alternating poles of the magnetic section of the motor. Immediately inboard of that, for example inboard of the circumferential line 62, would be the normal data zone 64 where the tracks for reading and writing data are found. These tracks would now extend all the way from the region where the magnets are established to the dramatically smaller size center hole of the disc on which the motor magnetic return path is distributed. Alternatively, the thickness of the disc could also be increased at least in a radial edge zone with the magnetic poles underlying that radial region of the disc.

Figure 2D:
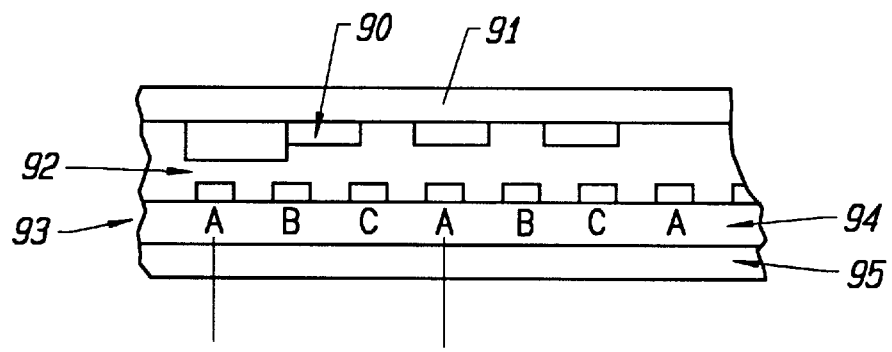
FIG. 2D illustrates the elements of a variable reluctance motor which could be incorporated in the device of FIGS. 2A and 2B.

To make the disc 30a spin, windings are mounted for example from the top or bottom of the housing and not supported from the center bearing module. For example, a polyphase stator 43 corresponding to the windings of a motor may be provided adjacent the edge of the rotating disc. The polyphase stator is formed of three separate periodically overlapping leads 33A, B, C as shown in greater detail in FIG. 2C. This stator which could be imprinted on a separate disc would work in one of two different ways cooperating with a rotor in the region 64 on the rotating disc which comprises the permanent magnets described above, or cooperating with the teeth of a variable reluctance motor. The stator windings 33 could either be distributed over the circumference of the disc or other support 43 or concentrated in defined regions i.e. segments of the outer circumference. Distributed, a layered construction of stator conductors on a back iron, works best with small pole spacing and air gaps for either a standard or variable reluctance motor. For example, the variable reluctance motor as shown in FIG. 2D would have teeth 90 mounted on a rotatable magnetic disc 91 which in its furthest radial region serves as a back iron for the magnetic teeth; the remainder of the disc stores data. Supported across an air gap 92 of about 1 mil, windings 93 are mounted in a fixed position with a backing of both insulations 94 and back iron 95. This physical relationship, when alternating currents are applied to the windings, creates a revolving field which interacts with the teeth, causing a defined speed of rotation of the disc as a function of the magnitude of the current applied. The electronics to control the currents through the stator windings can also be either concentrated in a small region adjacent the windings, or distributed over a region. The windings could also be formed or printed on a multilayer PCB to facilitate end turn cross overs.

Where the windings 33 are wound over a steel support structure, then the disc 60 would be self centering, and in the ideal situation would be supported on a hydrodynamic bearing for rotation past the read/write heads supported from flexures 80. The hydrodynamic bearing would include the central pole which provides horizontal and vertical stability for the rotating disc in the space between the rotating top disc and the fixed lower disc, operating in accordance with the principles described in the Leuthold et al. patent application, U.S. Pat. No. 5,487,608 issued Jan. 30, 1996, U.S. Ser. No. 08/278,754 filed Jul. 22, 1994, incorporated herein by reference. In fact, there may not even need be a center bearing in this design, but a single point contact for pivoting of the rotating disc relative to the fixed disc. With such a point contact support, then the hydrodynamic bearing formed between the two relatively rotating discs of the present design would provide the necessary stiffness to keep the rotating data storing disc centered both centrally and laterally so that it would not collide with the transducer 80.

FIG. 3A illustrates an alternative design of a distributed spindle motor integrated with a disc which supports a slightly larger feature size. This particular approach, as will be seen better below, works best with larger air gaps and with larger pole pitches. The approach therefore does not require semiconductor technology to fabricate the stator conductors directly onto the disc or integrated with the surface of the disc, and does not require substantial modification in electronic driver technology.

In this embodiment, a polyphase motor as shown in FIG. 3A includes windings 104A, B, C which extend only part of the way around the periphery. That is, they are wound over teeth which occupy, in a three phase motor, three discrete sections or modules of the circumference of what in this case would be the stator 102. In this particular embodiment the lower disc 102, which in fact could be integral with or stably supported on the housing, is a disc-shaped region 100 which in fact comprises a permanent magnet, which is etched to define discrete teeth 102. Discrete windings 104A, B and C are provided as mentioned above wound over discrete regions of this disc shaped portion in order to be energized and cooperate with the rotor to cause a constant speed rotation of the upper disc 110 which again has the data zones 64 thereon. The edges of this upper disc have teeth 112 etched thereon. This portion of the disc is a ferrous material for cooperating with the motor phases to cause rotation of the data storing disc. As is well known in the polyphase motor technology, the permanent magnet and windings of the rotor portion 100 will cooperate with the toothed region of the ferrous material of the disc 110 so that with fluctuations in the current through the stator phases 104, the teeth 112 of the rotating disc will attempt to line up with the teeth 102 in the stator portion, and this alignment will constantly change as the currents move through and are varied in the various stator phases. This adaptation and improvement over what is already known in the art as a Sawyer linear motor is shown herein in FIG. 3B and extensively discussed, for example, in U.S. Pat. No. 4,335,338 (Sawyer) incorporated herein by reference.

Thus as appears in FIG. 3B, the typical Sawyer linear motor which in this example is a two phase motor includes adjoining north and south poles, with windings 120, 122 around the adjacent poles in this two phase motor. The permanent magnet flux will go around the structure in the direction of the arrows 124, 126. The direction of movement of the section of the motor 130 which does not carry any coils relative to the opposing section is a function of the energization direction and magnitude of the current flow through the phases 120, 122; this will either add to or subtract from the naturally occurring flux field, thus causing rotation of the motor.

The same type of motor with more concentrated windings is shown in FIG. 3C. The basic principle herein is to have thrust modules spaced around the periphery of the disc, either with or without stationary permanent magnets. The latter has the benefit of more efficient operation. Each phase module shown in FIG. 3D interacts with steel rotor disc teeth to produce torque.

The upper phase module 300 includes a sequence of teeth 302 and a magnet 304 disposed between the two sections. Windings 308, 309 are disposed over each of the sets of teeth. Signals applied to the windings will cause displacement of the rotor carrying steel teeth 120 shown in FIG. 2D.

An alternative, more efficient arrangement comprises a plurality of phase modules 320, also shown in FIG. 3D. Each of these modules includes a sequence of teeth 302 interrupted by gaps 320 symmetrically located on either side of phase magnet 322. A wire coil linearly wound over gaps 320 creates the magnetic field to cause the facing disc 120 (FIG. 3D) to rotate.

A further embodiment of the spindle motor integrated with a disc for rotating the disc is shown in FIG. 4 in which a homopolar motor is utilized. The embodiment of FIG. 4 is what may be called a homopolar motor, comprising a rotatable magnetized top disc 64 which is magnetized with a unidirectional B field; this will cooperate with the stator windings which are shown distributed along the edge region 150 of the stationary lower disc 160 which is integrated with or directly supported from the housing. Once again, the windings are preferably imprinted on the stationary disc 160 by known integrated circuit fabrication techniques; they are disposed and energized in a sequence through leads 162 so that the current generally flows radially. Thus as shown by force diagram at the lower portion of the figure, the torque on the data carrying disc 64 is in a direction to cause it to rotate in the direction of the arrow 166. That is, according to the known laws of magnetics, the cross product of the current indicated by the letter I and the flux represented by the letter B on the force diagram 168 will cause a tangential force to be imposed on the disc 64, causing its rotation.

Such a homopolar motor is useful as a spindle motor because it is responsive to the magnitude of the applied current to achieve a defined speed. Thus this motor requires careful maintaining and adjustment of the magnitude of the current; this is achieved using control circuits of a design already well known in this field and not part of this invention. Such circuits are distinct and different in design than typical motors which are speed controlled by a count of back emf crossings. For example, in such a spindle motor driver by a homopolar motor, the heads would read and write data on the disc, these same heads would read marks having a known spacing around the disc surface so that appropriate circuitry could establish disc rotational speed. For example, the embedded servo data written on a disc surface, being regularly spaced, could as well be analyzed for disc rotational speed on a constant basis. Thus it should also be noted that the homopolar motor could also be used as an actuator arm positioning motor by regulating both magnitude and duration of the current applied to the motor. This however would also alter the appearance of the actuator arm of a disc drive, as the pivot point of the actuator arm would have a homopolar disc arm around it; the movement of the disc would cause proportional movement of the transducers around the arc. By appropriate switches of current polarity or ceasing switching of the current at control 166, holding the current constant, the disc 64 is caused to cease rotation.

A further consideration in all these designs is distribution of the forces. The field established by the stator produces torque to cause motion, but may also create attractive forces which disrupt motion of the stator over the rotor, especially where the stator is axially aligned with the rotor. Therefore it may be important in many embodiments to fill in the gaps between teeth or over windings with a plastic or other non-magnetizable material. This being done, the rotating disc can be stabilized by applying the phenomena associated with air films between two smooth surfaces described in the application of D. Jennings entitled "Squeeze Film Damping for a Hard Disc Drive", Ser. No. 08/727,858, filed Oct. 8, 1996, assigned to the assignee of this invention and incorporated herein by reference.

If the disc rotor has permanent magnets deposited on the surface as described above with respect to FIG. 3, then in an alternate embodiment the magnets of the rotor may be replaced by steel teeth. Torque to cause rotation will be developed following the known principle T=Bi l vsin α. However, it is important to note that only in the normal region between opposed teeth is the force attractive; in the regions adjacent the normal region, the force developed is repulsive. Operation in this region would require feedback from an undriven phase to avoid instability.

Figure 5A:
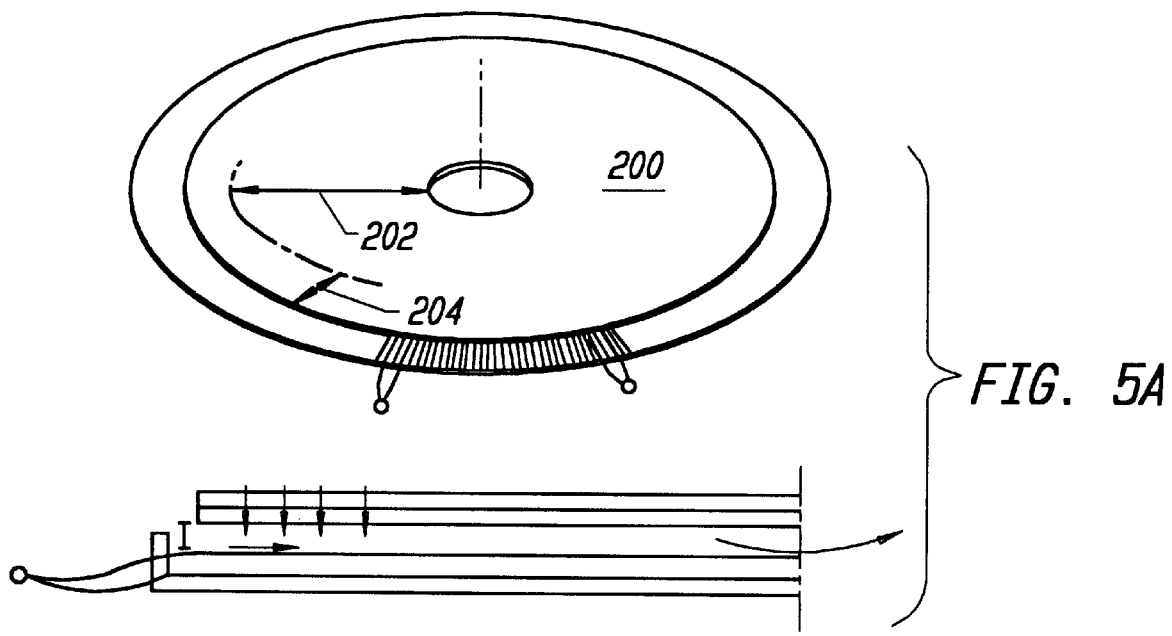
FIGS. 5A, 5B and 5C illustrate further alternative embodiments to increase capacity and control.
Figure 5B:
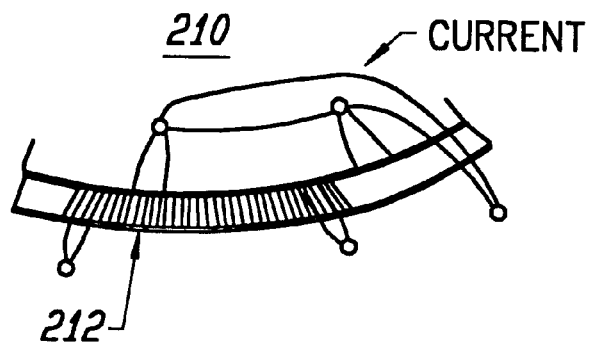
Figure 5C:
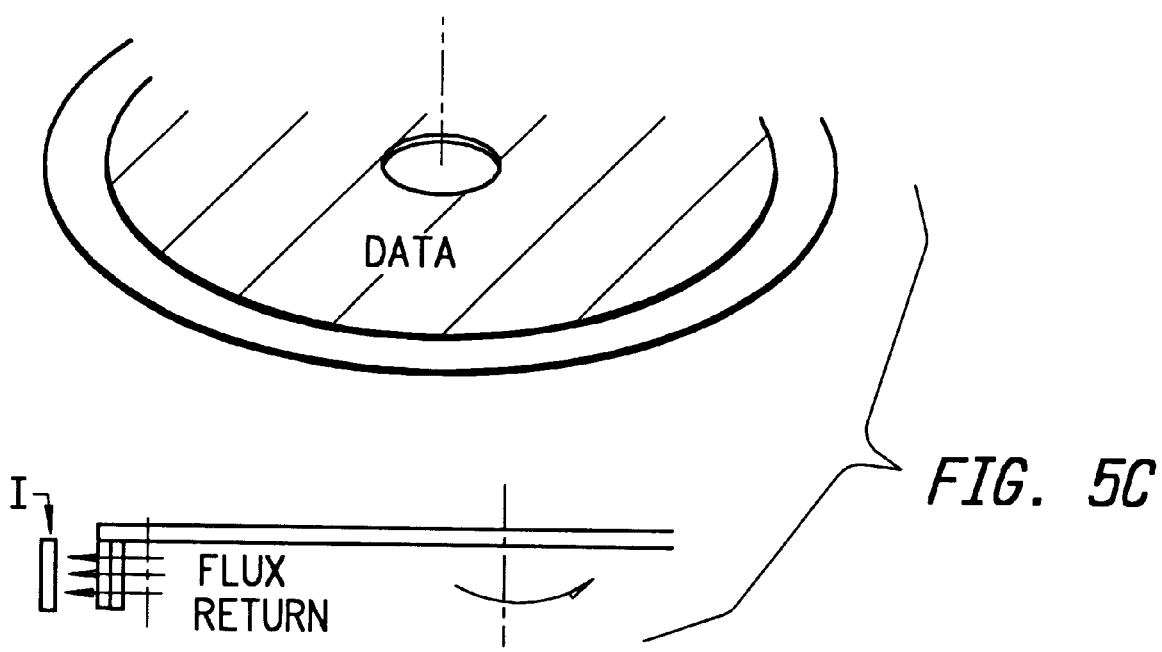

As a further alternative, a distributed motor can be designed using the principles described above incorporating permanent magnets having unidirectional magnetization, in the axial direction. As shown in FIG. 5A, the data disc 200 has a data region 202 and magnet support region 204. The magnets are shown mounted at the outer diameter of the disc; they could also be at the inner diameter.

A current carrying stator 210 is shown mounted, stationary adjacent the rotating disc. Slots 212 are used to separate adjacent groups of conductors and to direct the current in the radial direction. Force is produced because the flux and current components are orthogonal, producing torque to cause rotation of the disc.

The magnets 204 are spattered onto the disc or deposited using semiconductor processing. Copper or aluminum deposited on an insulating surface form the conductors 214. The highest rotational force is produced if the magnet has a ferrous flux return path comprising the mounting disc; however a flux return is not required. It should be noted that this approach could lead to a double-sided design i.e. where two stator coil sets interact with magnets on a rotating disc to optimize the applied force; alternatively, the current coil support could be interposed between two magnet carrying discs, to optimize rotating data space.

In yet a further alternative, unidirectional magnets could be deposited at both the I.D. and O.D. of the data disc; axially aligned corresponding current coils would be mounted on the stator, to interact and cause disc rotation.

In this design, speed must be separately controlled. Servo information, being regularly spaced and separately read, may be processed for speed control. Other separately sensed information is available. For example, a separate magnetic may be deposited on the disc, with inductive or MR/Hall pickup. Alternatively, capacitive markers may be deposited on the rotating disc using a semiconductor process; the varying capacitance as the motor spins produces a cyclic signal. That is when the tooth markers line up, capacitance is a maximum as the gap from stator to rotor is a minimum. When they are not aligned, the capacitance is minimized. In this way a phase locking signal of 100 to 5,000 cycles per revolution is possible for phase and speed control.

Other features and advantages of the present invention may become apparent to a person of skill in the art; therefore, the scope of the invention is to be limited only by the claims.

I claim:

1. A distributed spindle motor integrated with a disc comprising a series of stator windings distributed and supported around the radial edge surface of the disc and radially positioned to cooperate across a gap with said disc comprising a rotatable disc shaped array of teeth defining a variable reluctance motor, the disc thereby being driven by a revolving magnetic field, said disc comprising magnetic material, said teeth being formed as an extension of one surface of said disc, and facing a series of interleaved windings forming said stator windings across said gap.

2. A distributed spindle motor as claimed in claim 1 wherein said windings are mounted from a housing surrounding and enclosing said discs.

3. A distributed spindle motor integrated with a disc as claimed in claim 1 wherein said rotatable disc comprises data storage tracks on each surface thereof radially inside said circular disc shaped array of teeth.

4. A distributed spindle motor as claimed in claim 3 wherein said disc is supported for rotation within said housing by a hydrodynamic bearing.

5. A distributed spindle motor as claimed in claim 3 wherein said disc is supported for rotation by a point contact support, stiffness for said rotating disc being established by a hydrodynamic bearing established between said stationary disc and said rotating disc.

6. A distributed spindle motor as claimed in claim 1 wherein said windings are formed on a multilayer printed circuit board.

7. A distributed spindle motor as claimed in claim 1 wherein the stator comprises a ring or disc shaped magnetic material formed into teeth, said windings being wound over three discrete sections of said ring of magnetic material to form a three phase motor, the disc-shaped teeth of said disc cooperating with the field established by said windings to establish a constant speed rotation of said discs.

8. A distributed spindle motor as claimed in claim 7 wherein the currents through said windings are periodically modified to cause the teeth of the rotating disc to constantly align themselves with different ones of said discrete toothed section of said non-moving disc.

9. A distributed spindle motor as claimed in claim 7 wherein said rotating data disc carries magnetic structures in at least three distinct modules spaced around a periphery of said disc.

10. A distributed spindle motor as claimed in claim 7 wherein each said discrete section comprises first and second sections of teeth with a magnet disposed between the two sections, a winding being disposed over the teeth, signals applied to the windings causing displacement of the rotor.

11. A distributed spindle motor as claimed in claim 7 wherein each said discrete section comprises a sequence of teeth on either side of a phase magnet, gaps being located in said teeth symmetrically on either side of said magnet, and a wire coil wound over said gaps, energization of said coil causing rotation of said disc.

12. A distributed spindle motor integrated with a disc comprising a series of stator windings distributed and supported around the radial edge surface of the disc and radially positioned to cooperate across a gap with said disc comprising a rotatable disc shaped array of teeth cooperating with said windings to define a variable reluctance motor, said disc being magnetic and having a data storage region radially inside said teeth, said windings mounted across an air gap from said disc with a backing of isolation and a back iron supporting said windings from a housing for said disc.

13. A distributed spindle motor as claimed in claim 12 wherein said gaps between teeth are filled with nonmagnetic material to create a smooth surface.

14. A distributed spindle motor as claimed in claim 13 wherein said rotating disc is mounted sufficiently close to a stationary surface to stabilize said disc.

15. A distributed spindle motor as claimed in claim 12 wherein said magnets of said stator are replaced by steel teeth, and including means for feeding current from undriven phases of said motor to driven phases to avoid instability.

16. A distributed spindle motor as claimed in claim 12 including means for controlling signal phase and speed by measuring capacitance between the rotor and the stator as the magnet teeth move relative to the current carrying coils.

17. A motor as claimed in claim 12 wherein said insulations is 1–5 mil thickness and said back iron is 2–5 mil thickness.

18. A distributed spindle motor as claimed in claim 12 wherein said disc is supported for rotation within said housing by a hydrodynamic bearing.

19. A distributed spindle motor as claimed in claim 12 wherein said disc is supported for rotation by a point contact support, stiffness for said rotating disc being established by a hydrodynamic bearing established between said stationary disc and said rotating disc.

20. A distributed spindle motor integrated with a rotatable data storage disc including a data storage region and a radial edge region of said rotatable data storage disc formed as a set of circumferentially adjacent teeth on said radial edge region of said disc and is magnetized with a unidirectional B field, a series of stator windings supported adjacent said radial edge region and positioned to cooperate across a gap with said rotatable disc, and said stator windings disposed for generally radial current flow so that, upon application of current, torque is established to cause rotation of said data disc.

21. A distributed spindle motor as claimed in claim 20 including means for controlling rotation of said disc by controlling polarity and magnitude of applied current.

22. A distributed spindle motor as claimed in claim 20 wherein said windings are imprinted on a stationary disc shaped support mounted on a housing for said disc.

23. A distributed spindle motor integrated with a rotatable storage disc including a data storage region and a radial edge region of said rotating data disc including unidirectional magnets formed as a set of circumferentially adjacent teeth on said radial edge region of said disc cooperating across a narrow gap with a stationary current source flowing in a radial direction; wherein said stationary current source comprises sets of radially directed conductors supplied by separate input and output leads and circumferentially separate, current flow being orthogonal to the direction of magnetization to cause rotation of said disc.

24. A distributed spindle motor as claimed in claim 23 wherein one of said magnet supporting discs is mounted axially on either side of said set of stator coils to optimize data storage regions.

25. A distributed spindle motor as claimed in claim 23 wherein said unidirectional magnets are located at an inner diameter and outer diameter of the data disc, and corresponding sets of radially directed current carrying coils are mounted to interact therewith.

26. A distributed spindle motor as claimed in claim 23 wherein said disc is supported for rotation within said housing by a hydrodynamic bearing.

27. A distributed spindle motor as claimed in claim 23 wherein said disc is supported for rotation by a point contact support, stiffness for said rotating disc being established by a hydrodynamic bearing established between said stationary disc and said rotating disc.

* * * * *